United States Patent [19]
Dischner et al.

[11] Patent Number: 5,848,744
[45] Date of Patent: Dec. 15, 1998

[54] TOOL BOX COOLER INSERT

[76] Inventors: Douglas P. Dischner, 731 8<sup>th</sup> St., Columbus, Nebr. 68601-7102; Jamie Fischer, 872 23<sup>rd</sup> Ave., Columbus, Nebr. 68601

[21] Appl. No.: 847,689

[22] Filed: Apr. 28, 1997

[51] Int. Cl.$^6$ .................. B60R 7/00; B60R 9/00
[52] U.S. Cl. .............. 224/404; 224/433; 224/435; 224/527; 296/37.6
[58] Field of Search .................. 224/404, 433, 224/435, 527; 206/349; 296/37.6, 39.1, 39.2; 220/410, 412, 413, 523, 528; 62/457.1, 457.5, 457.7, 239

[56] References Cited

U.S. PATENT DOCUMENTS

| | | | |
|---|---|---|---|
| D. 309,406 | 7/1990 | Ridings | D7/605 |
| D. 349,091 | 7/1994 | Dickinson | D12/406 |
| 3,057,508 | 10/1962 | Kimbrough, Jr. | 62/457.5 |
| 4,027,778 | 6/1977 | Tupper | 220/354 |
| 4,213,309 | 7/1980 | Pifer | 62/332 |
| 4,543,798 | 10/1985 | Page | 224/404 |
| 4,674,665 | 6/1987 | Van Kirk | 224/273 |
| 4,846,346 | 7/1989 | Kime | 206/372 |
| 4,936,624 | 6/1990 | West | 296/37.6 |
| 4,967,944 | 11/1990 | Waters | 224/273 |
| 5,050,399 | 9/1991 | Peahl | 62/244 |
| 5,080,250 | 1/1992 | Dickinson et al. | 220/335 |
| 5,137,322 | 8/1992 | Muirhead | 296/39.2 |
| 5,598,961 | 2/1997 | Sills | 224/404 |

*Primary Examiner*—David J. Walczak
*Assistant Examiner*—Timothy L. Maust
*Attorney, Agent, or Firm*—Zarley, McKee, Thomte Voorhees & Sease

[57] ABSTRACT

A cooler insert for a pickup truck bed tool box is formed of a size and shape to conform to and substantially fill a portion of the tool box. The lid of the cooler insert may be either secured to the tool box lid or independently connected to the cooler insert. The cooler insert has a raised lateral extension which conforms to and substantially fills the portion of the tool box which extends over the pickup truck bed side walls for supporting the tool box thereon.

12 Claims, 3 Drawing Sheets

TOOL BOX COOLER INSERT

BACKGROUND OF THE INVENTION

1. Technical Field

The present invention is directed generally to a thermally insulated cooler for storage of food, beverages, fish, bait and the like, and more particularly to such a thermally insulated cooler of a size and shape to generally fill and conform to at least a portion of the interior space of a pickup truck bed tool box.

2. Description of the Prior Art

Because pickup trucks have limited space within the cab, many craftsmen and sportsmen keep their tools and sporting goods in a tool box arranged across the front end of the pickup truck bed. Such tool boxes are well known and generally have one or more hinged lids, often a pair of lids hinged at the center for accessing opposite sides of the tool box.

Both craftsmen and sportsmen often have a need for cold storage of food or beverages and sportsmen may additionally require cold storage for fish, bait or the like. Since anything larger than little six pack coolers take up undue space within the cab of a pickup truck, the cooler is generally placed in the truck bed where it can be readily seen, opened or stolen.

Accordingly, a primary object of the present invention is to provide a cooler insert for a pickup truck bed tool box.

Another object is to provide such a cooler insert which generally fills and conforms to at least a portion of the interior space of a pickup truck bed tool box.

Another object is to provide such a cooler insert wherein the cooler lid is fixed to the tool box lid so that the cooler is opened upon opening the lid of the tool box.

Another object is to provide such a cooler insert which provides raised separate storage for articles that should be kept dry.

Another object is to provide such a cooler insert which is designed to be stored out of sight within a pickup truck bed tool box and which can be secured against tampering or removal by the usual locking of the tool box.

Another object is to provide such a cooler which is designed to be readily removable from the tool box for draining and cleaning of the cooler insert.

Finally, an object of the invention is to provide a pickup truck bed tool box cooler insert which is simple and rugged in construction, economical to manufacture and efficient in operation.

SUMMARY OF THE INVENTION

The cooler insert of the present invention is made of a size and shape for placement within a pickup truck bed tool box of the type that spans the width of the truck bed adjacent the cab of the truck. The cooler insert has a front wall, back wall, opposite side walls and a bottom wall, all of a thermal insulation material. A drain opening may be provided in at least one of the walls, with a removable plug provided to normally close the drain opening. A cooler lid of a size and shape for closing the open top of the cooler insert is likewise formed of a thermal insulation material and may be secured either to the tool box lid so that the cooler insert is automatically opened and closed with the tool box lid or it may be separately mounted on the cooler to maintain the contents cold and covered even when the tool box is opened. The cooler insert preferably includes an interior shelf elevated above the bottom wall for keeping contents on the shelf dry.

The cooler insert preferably has a raised lateral extension adapted to substantially conform to and generally fill the portion of the tool box which protrudes outwardly over the pickup truck bed sidewalls for supporting the tool box thereon. An interior divider wall is associated with the raised lateral extension to define an open topped shelf for separate storage of articles within the cooler insert.

DESCRIPTION OF THE PREFERRED EMBODIMENT

Figure 1:
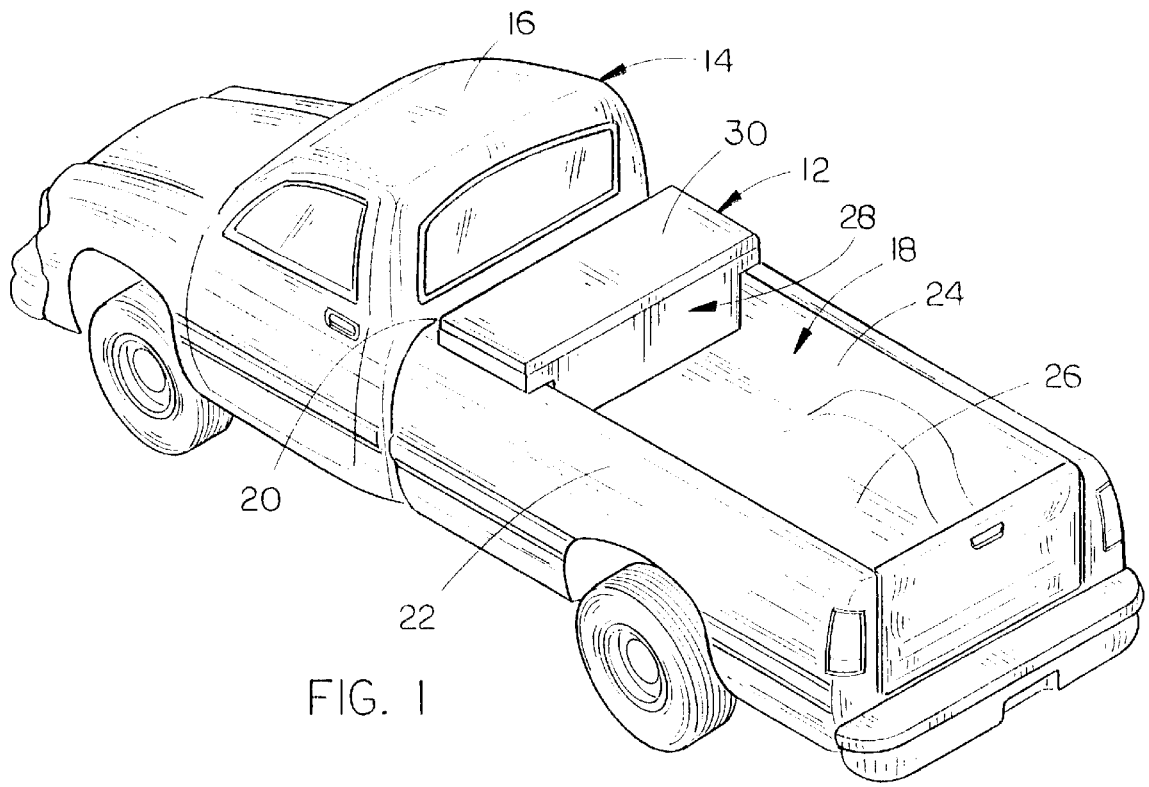
FIG. 1 is a perspective view of a pickup truck provided with the tool box and cooler insert combination of the present invention.
Figure 2:
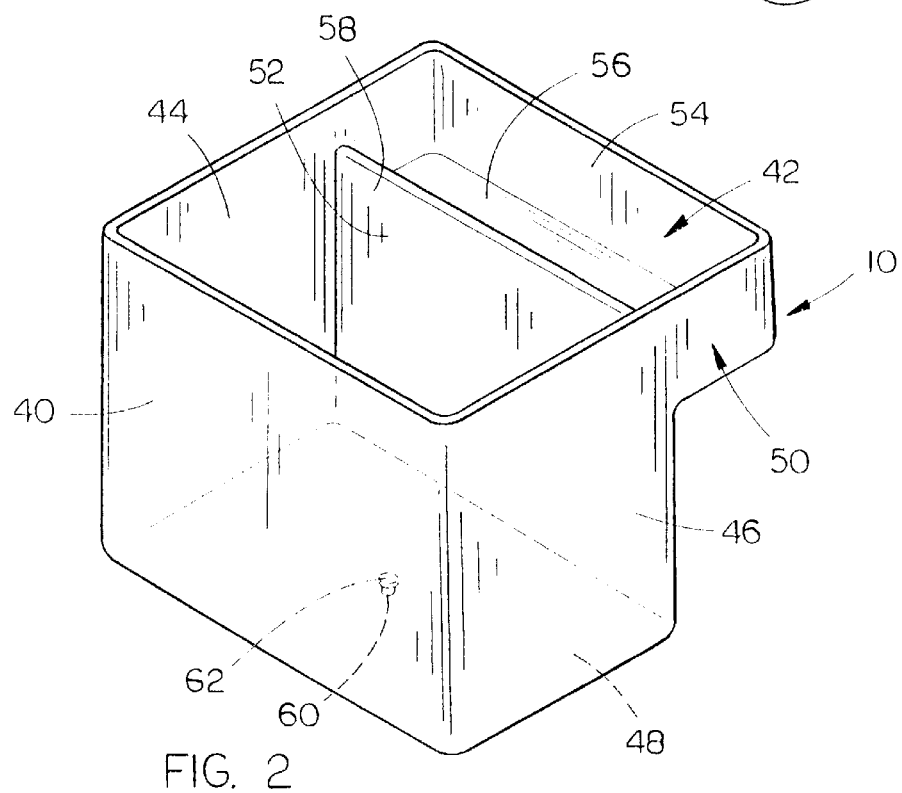
FIG. 2 is an enlarged perspective view of the cooler insert for the tool box.

The cooler insert 10 of the present invention, as illustrated in FIG. 2, is designed or placement within a pickup truck bed tool box 12, one example of which is illustrated in FIG. 1 on pickup truck 14. Truck 14 has a cab 16 situated forwardly of an elongated bed 18 having a front wall 20, opposite sidewalls 22 and 24 and a floor 26.

Figure 3:
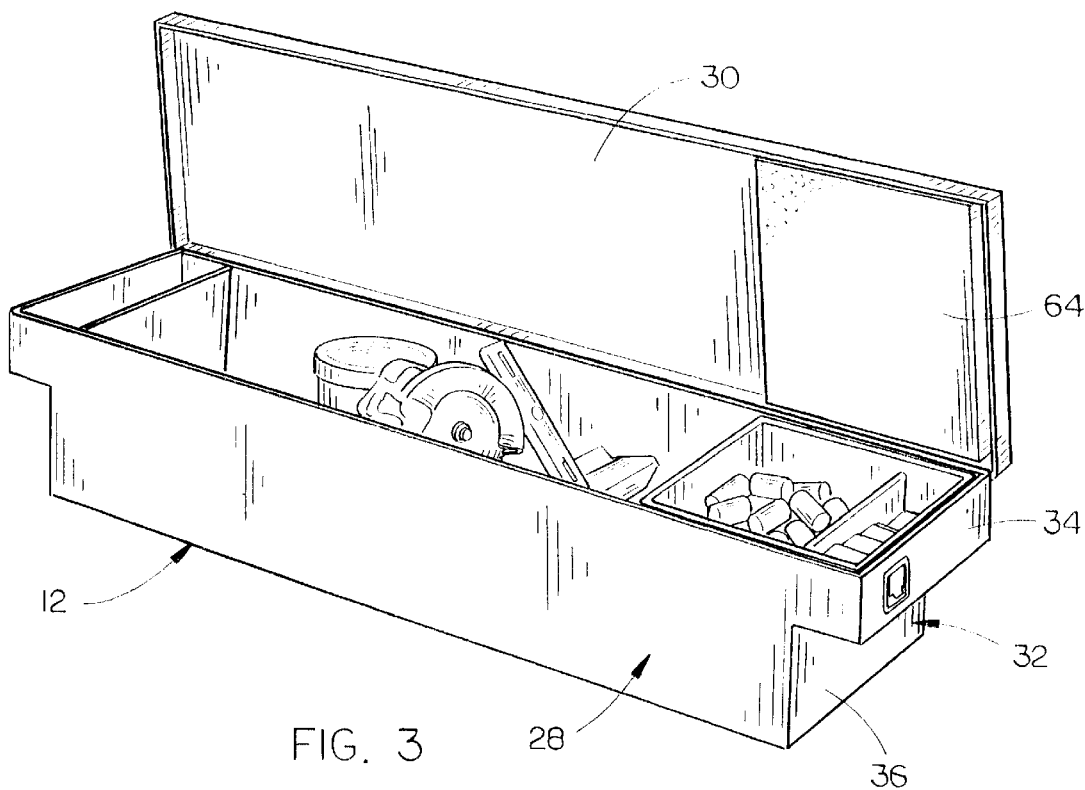
FIG. 3 is a perspective view of the truck bed tool box and cooler insert combination with the combined lids of the tool box and cooler insert open to show the interior of both.
Figure 4:
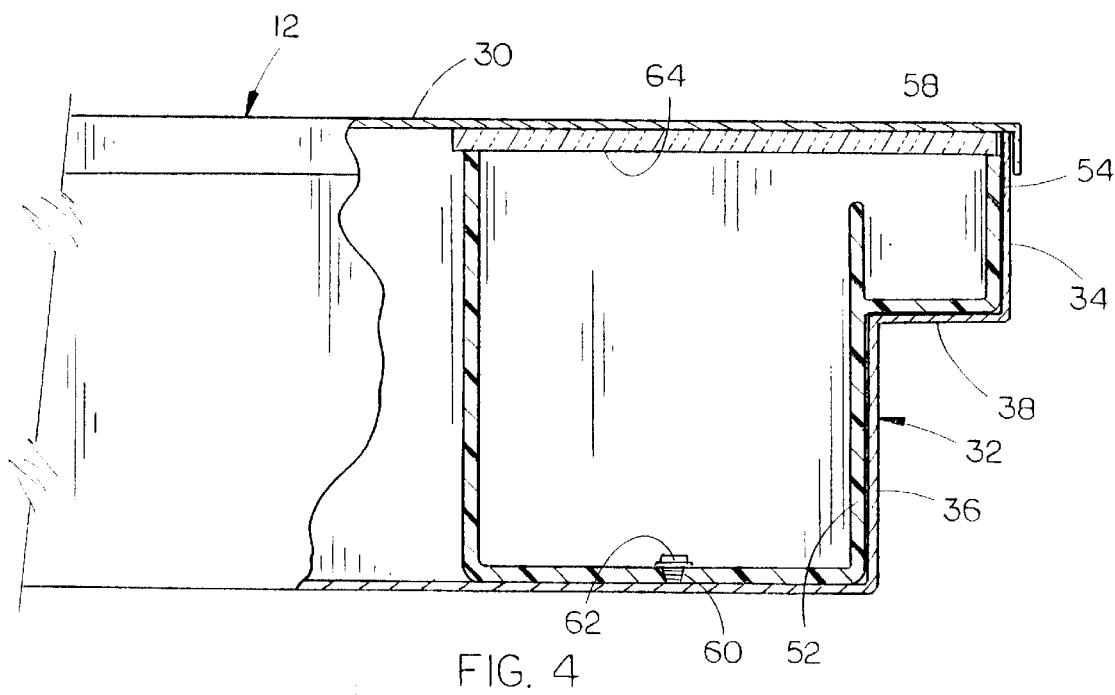
FIG. 4 is a partial enlarged front sectional view showing the cooler insert within the tool box.

The pickup truck bed tool box 12 is shown in FIG. 3 as including an elongated open topped storage container 28 having a lid 30 hinged to the container 28 for movement between the open position of FIG. 3 and closed position of FIG. 4. The tool box 12 is of a width to transversely span the pickup truck bed 18, as shown in FIG. 1.

The tool box storage container 28 is usually provided with stepped sidewalls 32, each having an upper portion 34 connected to a lower portion 36 by a raised bottom wall 38 extended transversely outwardly from the lower portion of the tool box. That raised bottom wall 38 is adapted to rest on a respective side wall 22, 24 of the pickup truck bed 18 adjacent the cab 16 for supporting the tool box 12 on the sidewalls in spaced relation above the floor 26 of the truck. The stepped sidewalls 32 cooperate to define an upper portion of the storage container 28 which is of greater width than the lower portion below the raised bottom wall 38.

Referring to FIG. 2, the cooler insert 10 is of a size and shape for placement within the tool box 12. The cooler insert 10 has a front wall 40, back wall 42, opposite side walls 44 and 46 and a bottom wall 48, all of a thermal insulation material.

The cooler insert 10 is preferably formed with a raised lateral extension 50 which is adapted to substantially conform to and generally fill the portion of the tool box 12 above the raised bottom wall 38. This is accomplished by providing the side walls 44 and 46 with a somewhat inverted L-shape and providing the back wall 42 as a stepped wall including lower portion 52 and an outwardly spaced upper portion 54 connected to the lower portion by a raised bottom wall 56. A divider wall 58 preferably extends upwardly from the raised bottom wall 56 to define an open topped shelf for separate storage of articles within the cooler insert 10. That divider wall 58 may simply be an upper extension of the lower portion 52 of back wall 42.

A drain opening 60 is preferably provided through at least one wall, as shown in FIGS. 2 and 4 in connection with the bottom wall 48. A removable plug 62 is insertable into the drain opening 60 for normally closing it. The entire cooler insert 10 is readily removable from tool box 12 for draining, cleaning and for any other purpose.

To close and thermally insulate the open top of the cooler insert 10, a cooler lid 64 of a thermal insulation material may be secured to the underside of the tool box lid 30 at a position where it closes and seals the open top of the cooler insert upon closing of the tool box lid 30. Cooler lid 64 may be a panel of styrofoam or other thermal insulation material. Alternately, the cooler lid 64 could have edges or side walls conforming to the top edge of the cooler insert to provide a custom sealed connection.

Figure 5:
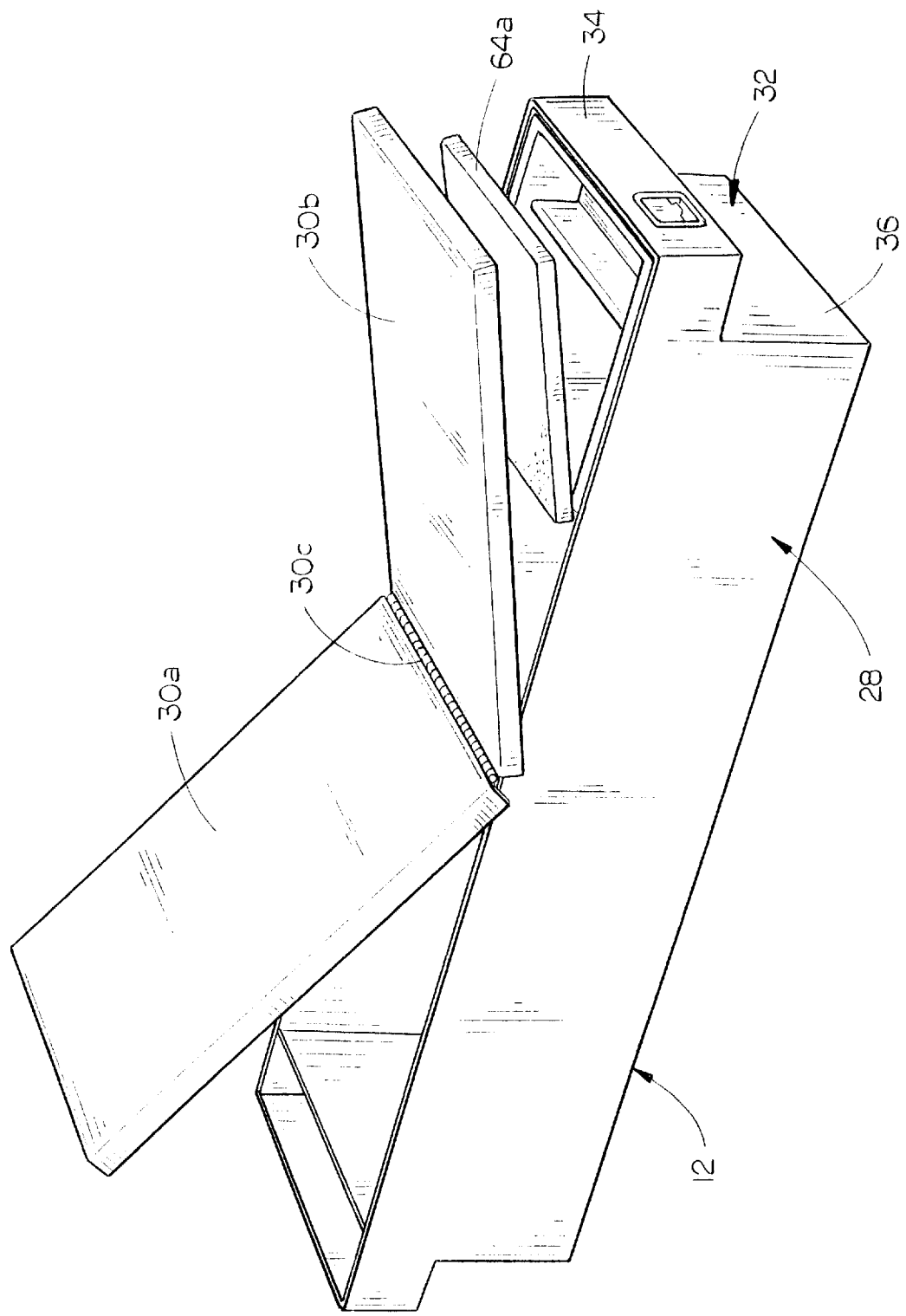
FIG. 5 is a perspective view of an alternate embodiment of a truck bed tool box and cooler insert combination wherein the tool box has a pair of lids hinged at the center.

FIG. 5 illustrates an alternate embodiment of tool box 12 wherein the single lid 30 is replaced by a pair of lids 30a and 30b hinged along the longitudinal centerline 30c as is common with many pickup truck bed tool boxes. The cooler insert of the present invention is equally applicable with either form of tool box. FIG. 5 also illustrates a separate lid 64a hinged to the cooler front wall 40 for easy access to the contents of the cooler. By separating the cooler lid 64a from the tool box lid 30, the cooler can stay closed and cool even when the tool box lid 30b is opened to access tools or other goods stored adjacent the cooler insert 10.

The cooler insert 10 is preferably formed of plastic material so that it can be readily wiped down. Whereas the walls of the cooler insert are illustrated as being formed of a solid thermal insulation material, they could alternately be formed as double thin walls of plastic or metal sheeting or the like with an insulation material filling the gap between the dual walls, as in many conventional coolers. Likewise, the cooler lid can be of any construction to accommodate closing, sealing and thermally insulating the open top of the cooler insert.

Whereas the cooler insert 10 of the present invention has been illustrated in connection with preferred embodiments thereof, it is apparent that many modifications, substitutions and additions may be made which are within the intended broad scope of the appended claims.

We claim:

1. An open topped cooler insert of a size and shape for placement within a pickup truck bed tool box, comprising:
    said cooler insert having a front wall, back wall, opposite side walls and a bottom wall, all of a thermal insulation material;
    a cooler lid formed of a thermal insulation material of a size and shape for closing the open top of said cooler insert at times;
    said cooler insert being of a size and shape to substantially conform to and substantially fill at least a portion of the pickup truck bed tool box;
    said cooler insert formed to include an interior shelf elevated above the bottom wall thereof for keeping contents on said shelf dry;
    said cooler insert having a raised lateral extension protruding outwardly from one wall in spaced relation above the bottom wall thereof to substantially conform to and generally fill an end portion of the tool box.

2. The combination of claim 1 further comprising a divider wall extended upwardly from said raised bottom wall to define an open topped shelf for separate storage of articles within said cooler insert.

3. The combination of claim 2 wherein said cooler insert includes a drain opening through at least one wall thereof and a removable plug for normally closing said drain opening.

4. In a pickup truck bed tool box including an elongated open topped storage container and a lid connected to said container for movement between open and closed positions, said tool box being of a size and shape to transversely span a pickup truck bed, comprising:
    an open topped cooler insert of a size and shape for placement within said tool box, said cooler insert having a front wall, back wall, opposite side walls and a bottom wall all of a thermal insulation material; and
    a cooler lid formed of a thermal insulation material of a size and shape for closing the open top of said cooler insert at times;
    said cooler insert being of a size and shape to substantially conform to and substantially fill at least a portion of the interior of said pickup truck bed tool box;
    said open topped storage container of said tool box including stepped side walls defining an upper portion of greater width than a lower portion thereof, said upper portion including raised bottom walls extended transversely outwardly from said lower portion and adapted to rest on side wall of a pickup truck bed for supporting the tool box thereon;
    said cooler insert having a raised lateral extension adapted to substantially conform to and generally fill the portion of said tool box above said raised bottom wall.

5. The combination of claim 4 further comprising a divider wall extended upwardly from said raised bottom wall to define an open topped shelf for separate storage of articles within said cooler insert.

6. The combination of claim 5 wherein said cooler insert includes a drain opening through at least one wall thereof and a removable plug for normally closing said drain opening.

7. The combination of claim wherein said walls of said cooler insert are formed of plastic material.

8. In a pickup truck having a cab situated forwardly of an elongated bed having a front wall, opposite side walls, and a floor, the combination of:
    a pickup truck bed tool box including an elongated open topped storage container and a tool box lid hinged to said container for movement between open and closed positions, said tool box being of a width to transversely span a pickup truck bed; and
    an open topped cooler insert of a size and shape for placement within said tool box, said cooler insert having a front wall, back wall, opposite side walls and a bottom wall, all of a thermal insulation material; and
    a cooler lid formed of a thermal insulation material of a size and shape for closing the open top of said cooler insert at times;
    said cooler lid being fixed to said tool box lid whereby said cooler is opened in response to movement of the tool box lid to the open position thereof;
    said cooler insert being of a size and shape to substantially conform to and substantially fill at least a portion of the interior of said pickup truck bed tool box;
    said open topped storage container of said tool box including stepped side walls defining an upper portion of greater width than a lower portion thereof, said upper portion including raised bottom walls extended transversely outwardly from said lower portion and adapted to rest on the opposite side walls of the elongated bed of a pickup truck adjacent the cab for supporting the tool box thereon;
    said cooler insert having a raised lateral extension adapted to substantially conform to and generally fill the portion of said tool box above said raised bottom wall.

9. The combination of claim 8 further comprising a divider wall extended upwardly from said raised bottom wall to define an open topped shelf for separate storage of articles within said cooler insert.

10. The combination of claim 9 wherein said cooler insert includes a drain opening through at least one wall thereof and a removable plug for normally closing said drain opening.

11. A The combination of claim 10 wherein said walls of said cooler insert are formed of plastic material.

12. In a pickup truck having a cab situated forwardly of an elongated bed having a front wall, opposite side walls, and a floor, the combination of:

a pickup truck bed tool box including an elongated open topped storage container and a tool box lid hinged to said container for movement between open and closed positions, said tool box being of a width to transversely span a pickup truck bed; and an open topped cooler insert of a size and shape for placement within said tool box, said cooler insert having a front wall, back wall, opposite side walls and a bottom wall, all of a thermal insulation material; and a cooler lid formed of a thermal insulation material of a size and shape for closing the open top of said cooler insert at times;

said cooler lid being fixed to said tool box lid whereby said cooler is opened in response to movement of the tool box lid to the open position thereof;

said cooler insert being of a size and shape to substantially conform to and substantially fill at least a portion of the interior of said pickup truck bed tool box;

said cooler insert formed to include an interior shelf elevated above the bottom wall thereof for keeping contents on said shelf dry.

\* \* \* \* \*